Reissued Dec. 31, 1929 Re. 17,541

UNITED STATES PATENT OFFICE

ALLEN F. OWEN, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

METHOD OF PREPARING WATERPROOFING COMPOSITIONS AND PRODUCTS

No Drawing. Original No. 1,656,953, dated January 24, 1928, Serial No. 28,734, filed May 7, 1925. Application for reissue filed March 26, 1928. Serial No. 350,123.

This invention relates to a method of preparing a waterproofing composition and to the product thereof, more particularly to a method of preparing a waterproofing composition suitable for waterproofing fibrous material such as paper.

There are many fibrous materials employed in the arts, the use of which can be greatly extended if they can be waterproofed in a cheap and efficient manner. For instance a large number of products are packaged in bags made of paper or fabric, and the use of such bags is limited to materials which are not injured or affected by moisture and atmospheric conditions, unless precautions are taken to shield them. As an example, cement has for years been largely packaged in fabric bags but it has been necessary to carefully protect the bags of cement while in storage against access of moisture, and while it has been customary to reuse the empty bags when possible, a large proportion of them have been rendered unfit for further use by contact with moisture. Owing to the expense of such bags attempts have been made to substitute paper ones for them, but such bags are also open to the objection that they do not prevent access of moisture to the contents, and moreover the bags themselves when subjected to moisture become weakened and liable to burst. While many articles of a more or less hygroscopic nature such as salt, sugar, and similar materials are also being packed in paper bags, their contents are frequently injured or agglomerated by contact with moisture. Many other food products and materials which are at present packed in paper bags deteriorate to some extent when packed in such bags, due to the escape of volatile constituents or to the absorption of undesirable elements from the atmosphere.

An object of the invention is to provide a simple, cheap and easily-carried out method of making a waterproofing composition suitable for proofing fibrous materials such as paper and fabrics. Another object is to provide a cheap and easily applied waterproofing compound. Another object is to provide a waterproofing compound of such a character that it will not only waterproof fibrous material to which it is applied, but will also strengthen the same. Another object is to provide a waterproofing composition in the form of a water dispersion so that the material to be proofed can be treated merely by coating with the dispersion and drying.

For a detailed disclosure of the nature and objects of the invention reference is had to the accompanying specification and claims.

Without intention to limit the invention otherwise than as required by the prior art, it consists broadly in dispersing a heavy metal saponification product in a water dispersion of rubber, with or without the addition of filling material and coloring if desired. In some cases there may be added to the product thus obtained a water emulsion of an oil, and where a vulcanized product is desired sulphur and a suitable accelerating ingredient or ingredients may also be included, or instead a vulcanized dispersion of rubber or an aqueous dispersion of vulcanized rubber may be employed.

In carrying out the preferred form of the invention the saponification product of a metal such as aluminum, zinc, or lead, with various resins, or with stearic, oleic or palmitic acids, for example, is mixed in dry form with a water solution of a suitable colloid such as glue. These saponification products are both water insoluble and water repellant. If a filler is to be used the dry filler and the saponification product are first mixed and then dispersed in the water solution of the colloid. In place of the glue any other suitable colloid such as saponin, casein, starch, albumin, gum Karaya, potassium or sodium oleates, etc. may be used. The mixture thus obtained may then be passed through a paint mill or similar machine to complete the dispersion and mixing, and the resulting product then stirred into a water dispersion of rubber. This dispersion may be rubber latex, either vulcanized or unvulcanized, or any artificial rubber dispersion.

In some cases it may be desirable to add an oil, and if so this is first made up into a water emulsion and then added to the above compound. The consistency of the resulting mix may be varied as desired by adding water.

Suitable fillers are gilders whiting, clays and talc, but any other appropriate ones may be used.

As an example of a suitable compound the following is given:

100 parts rubber as latex, 100 parts aluminum resinate, 100 parts gilders whiting, 50 parts medium spindle oil, 15 parts glue or other protective colloid.

Another compound is as follows:—

100 parts rubber as latex, 10 parts aluminum resinate, 50 parts talc, 10 parts glue or other protective colloid.

The aluminum resinate can be varied in amount or partially or wholly replaced by other heavy metal saponification products such as those previously named. The glue can also be varied somewhat in quantity or replaced by any other suitable protective colloid, or in some cases it may be omitted. The spindle oil can be varied in amount or eliminated or replaced by other oils or so called rubber softeners such as parafin, rosin, pine, castor, cottonseed or palm oils, or cumar resin, pine or coal tar products, etc. These will vary the hardness and flexibility of the film. Sulphur can be introduced if desired to increase the dryness of the resulting film, and where a vulcanized product is preferred suitable accelerators may also be included, or instead of obtaining a vulcanized product in this manner the dispersion may be made up with the use of a vulcanized latex or other dispersion containing rubber in vulcanized form. The cost of the treated paper or other fibrous material and other factors such as the hardness desired in the waterproofing film will determine whether or not a vulcanized product is to be made. In certain cases it may be desirable to talc or otherwise treat the proofed material.

Instead of dispersing the heavy metal saponification product with a colloid it may be mixed into water directly and suitably dispersed, as by the use of a colloid mill or paint mill, and preferably in the presence of an alkali. If fillers are to be added they are preferably first mixed dry with the heavy metal saponification product and then dispersed as above stated. The resulting product is mixed with the rubber dispersion, and if mineral oil or its equivalent is to be used this may then be added in emulsified form; or instead the emulsified mineral oil or its equivalent may first be added to the rubber dispersion and the water dispersion of the heavy metal soap added last.

While the invention is not limited in its nature and is applicable to various fabrics and other fibrous materials, it has been found particularly suitable for waterproofing paper. Paper bags for Portland cement, which have been proofed according to the above invention on a standard coating machine have been found very satisfactory in service, and it has been found that paper proofed according to the invention withstood the pressure of a column of water 22″ high without penetration. The compound may be easily applied with a simple apparatus such as an ordinary brush paper coating machine, tub-sizing machine or in size boxes on a paper machine or by painting, spraying, dipping or in any other usual manner, etc., and where vulcanization is not desired, or where it has taken place previous to the coating, the only other step is that of drying. Since the compound is in the form of a water dispersion there are no noxious vapors to be taken care of during the drying operation, nor any risk of fire due to the giving off of inflammable vapors. If one of the so-called "cold curing accelerators" is employed where a vulcanized article is desired, the vulcanization may then be obtained at ordinary temperatures or temperatures considerably below the usual hot vulcanization temperatures. In addition to the above advantages the product of the invention whether vulcanized or unvulcanized has excellent ageing properties. As an instance when Kraft paper was coated with the compound given in the first example and aged in a hot air oven for 100 hours at 155° F. the coating was found to be in excellent condition and free from tackiness.

It will be seen that by the invention a simple, cheap and efficient process has been devised for making a waterproofing compound for fibrous material, and the product of the process is simply, easily and cheaply applied to the material to be proofed, with a resultant proofed material which is not only moisture proof but is also considerably strengthened.

With the above detailed disclosure of the invention it is evident that numerous modifications will suggest themselves to those skilled in the art, and it is not desired to limit the invention otherwise than as set forth in the appended claims.

Having thus described my invention what I claim and desire to protect by Letters Patent is:

1. The method of making a rubber composition which comprises mixing an aqueous dispersion of rubber, water and oil in the presence of a water repellent saponification product.

2. The method of making a rubber composition which comprises mixing an aqueous dispersion of rubber, water and oil in the presence of an insoluble heavy metal saponification product.

3. The method of making a waterproofing compound which comprises dispersing an insoluble heavy metal saponification product in a water dispersion of rubber.

4. The method of making a waterproofing compound which comprises dispersing a water insoluble and a water repellent saponification product in a water dispersion of rubber.

5. The method of making a waterproofing compound which comprises dispersing a water insoluble and water repellent heavy metal saponification product in a rubber latex.

6. The method of making a waterproofing compound which comprises dispersing a heavy metal saponification product in dry form in a water dispersion of a colloid, and mixing the dispersion with a water dispersion of rubber.

7. The method of making a waterproofing compound which comprises mixing a filler and a heavy metal saponification product in dry form, and dispersing the mixture in a water dispersion of a colloid, mixing the resulting product with a water dispersion of rubber, and then mixing with a water dispersion of an oil.

8. The method of making a waterproofing compound which comprises dispersing a water insoluble metallic saponification product in dry form in a water dispersion of a colloid, and mixing the dispersion with a water dispersion of rubber.

9. The method of making a waterproofing compound which comprises dispersing a heavy metal resinate in a water dispersion of a colloid, mixing the dispersion with a water dispersion of rubber and mixing the resulting product with a water dispersion of an oil.

10. The method of making a waterproofing compound which comprises dispersing a heavy metal saponification product in dry form in a water dispersion of glue, and mixing the dispersion with a water dispersion of rubber.

11. The method of making a waterproofing compound which comprises mixing a filler and a heavy metal saponification product in dry form, dispersing the mixture in a water dispersion of glue, stirring the resulting mix into a water dispersion of rubber, and mixing this product with a water dispersion of an oil.

12. The method of making a waterproofing compound which comprises dispersing aluminum resinate in dry form in a water dispersion of a colloid, and mixing the dispersion with a water dispersion of rubber.

13. The method of making a waterproofing compound which comprises dispersing aluminum resinate in a water dispersion of glue, then mixing with a water dispersion of rubber, and mixing the result with a water dispersion of an oil.

14. The method of making a waterproofing compound which comprises mixing a heavy metal saponification product with a water dispersion of a colloid, and mixing the result with rubber latex.

15. The method of making a waterproofing compound which comprises mixing a heavy metal resinate with a water dispersion of a colloid, mixing this product with rubber latex, and mixing the resulting product with a water dispersion of an oil.

16. The method of making a waterproofing compound which comprises mixing a filler and aluminum resinate in dry form, dispersing the mix in a water dispersion of glue, and mixing the resulting product with rubber latex.

17. The method of making a waterproofing compound which comprises mixing a filler and aluminum resinate in dry form, dispersing the mixture in a water dispersion of glue, mixing with rubber latex and adding the product to a water dispersion of light spindle oil.

18. As a new rubber product, a dispersion comprising water, oil, rubber, and a water repellent saponification product.

19. As a new rubber product, a dispersion comprising water, oil, rubber and an insoluble heavy metal saponification product.

20. As a new article, a waterproofing compound comprising a water dispersion of rubber and a water insoluble and water repellent saponification product.

21. As a new article, a waterproofing compound comprising a water dispersion of rubber, a heavy metal saponification product, and a colloid.

22. As a new article, a waterproofing compound comprising a water dispersion of rubber, a heavy metal resinate, a colloid, and an oil.

23. As a new article, a waterproofing compound comprising rubber latex, a heavy metal resinate, and a colloid.

24. As a new article, a waterproofing compound comprising rubber latex, aluminum resinate and glue.

25. As a new article, a waterproofing compound comprising a water dispersion of rubber, a filler, a heavy metal saponification product, a colloid, and an oil.

26. As a new article, a waterproofing compound comprising a water dispersion of rubber, a filler, a heavy metal resinate, a colloid, and an oil.

27. As a new article, a waterproofing compound comprising rubber latex, a filler, aluminum resinate, glue, and light spindle oil.

Signed at New York, county of New York, and State of New York, this 25th day of March, 1929.

ALLEN F. OWEN.